(12) United States Patent
Luo

(10) Patent No.: US 11,504,614 B1
(45) Date of Patent: Nov. 22, 2022

(54) HOUSING ASSEMBLY FOR VIDEO GAME CONTROLLER

(71) Applicant: Xiaohua Luo, E'Zhou (CN)

(72) Inventor: Xiaohua Luo, E'Zhou (CN)

( * ) Notice: Subject to any disclaimer, the term of this patent is extended or adjusted under 35 U.S.C. 154(b) by 0 days.

(21) Appl. No.: 17/848,454

(22) Filed: Jun. 24, 2022

(30) Foreign Application Priority Data

Jun. 24, 2021 (CN) .......................... 202121408098.6

(51) Int. Cl.
*A63F 13/24* (2014.01)
(52) U.S. Cl.
CPC .................................... *A63F 13/24* (2014.09)
(58) Field of Classification Search
None
See application file for complete search history.

(56) References Cited

U.S. PATENT DOCUMENTS

| 6,120,025 A * | 9/2000 | Hughes, IV ............ A63F 13/98 |
| | | 273/148 B |
| 10,201,747 B2 * | 2/2019 | Mistry ..................... A63F 13/24 |
| 2011/0034250 A1 * | 2/2011 | Brandt .................. A63F 13/245 |
| | | 463/37 |
| 2016/0357249 A1 * | 12/2016 | Webb .................. A63F 13/2145 |
| 2018/0165227 A1 * | 6/2018 | Maldonado ....... H04M 1/72409 |
| 2020/0398154 A1 * | 12/2020 | Tsuchiya ............... A63F 13/285 |
| 2021/0060417 A1 * | 3/2021 | Tseng ..................... A63F 13/24 |
| 2022/0126196 A1 * | 4/2022 | Brand ..................... A63F 13/24 |

* cited by examiner

*Primary Examiner* — James S. McClellan
*Assistant Examiner* — Peter J Iannuzzi

(57) ABSTRACT

A housing assembly for video game controller includes a body. The body includes an upper body and a lower body, the lower body, and two holding portions. The lower body is assembled with the upper body and anti-slip sleeves are sleeved on the holding portions. The anti-slip sleeves are detachably connected to the holding portions, and the anti-slip sleeves are smoothly connected to the body. The housing assembly for video game controller is not easy to slip off from hands of users and improves comfortable sensation of the users.

7 Claims, 1 Drawing Sheet

HOUSING ASSEMBLY FOR VIDEO GAME CONTROLLER

TECHNICAL FIELD

The present disclosure relates to a technical field of products of video game controller, and in particular to a housing assembly for video game controller.

BACKGROUND

With development of society and advancement of technology, computers become an essential device in homes of ordinary people. Video game controllers, as a counterpart of the computers, can conveniently and quickly operate video games and have become one of the increasingly popular components of computer equipment. A main function of ordinary video game controllers is to operate the video games, such as controlling directions, forward/backward, jumping, firing bullets, and so on.

At present, a housing of the video game controllers includes a body. The body includes an upper body, a lower body, and a battery cover. The lower body is stably assembled with the upper body, and the battery cover is matched with the lower body. A front end portion of the upper body and a front end portion of the lower body are matched and fixed to form a holding portion for hands of people to grasp. Since there is no special design on an outer surface of the holding portion, the outer surface of the holding portion is a smooth hard plastic surface like the body. The housing of the game handle having such structure is easy to slide off from hands of users, thereby affecting comfortable sensation of the users when using the video game controllers.

SUMMARY

The present disclosure aims at providing a housing assembly for video game controller, which is not easy to slip off from hands of users, and improves comfortable sensation of the users.

Technical solutions adopted by the housing assembly for video game controller are as follows:

A housing assembly for video game controller includes a body. The body includes an upper body and a lower body, the lower body, and two holding portions. The lower body is assembled with the upper body and anti-slip sleeves are sleeved on the holding portions. The anti-slip sleeves are detachably connected to the holding portions, and the anti-slip sleeves are smoothly connected to the body.

Optionally, a fixing hole is defined on a bottom end of each of the anti-slip sleeves, and each of the anti-slip sleeves is screwed to the body through the fixing hole.

Optionally, an annular inward convex step is disposed on an open end of each of the anti-slip sleeves, a groove matched with the inward convex step is defined on each of the holding portions, and the inward convex step is disposed in the groove.

Optionally, at least one limiting groove is defined on the upper body or the lower body, a limiting protrusion matched with the at least one limiting groove is disposed on an inner wall of each of the anti-slip sleeves, and the limiting protrusion is disposed in the at least one limiting groove.

Optionally, the anti-slip sleeves are anti-slip silica gel sleeves or anti-slip plastic sleeves, and convex patterns or bumps are defined on surfaces of the anti-slip sleeves.

Optionally, the anti-slip sleeves are formed through co-molding, an inner layer of each of the anti-slip sleeves is made of hard plastic, and an outer layer of each of the anti-slip sleeves is made of soft plastic.

Optionally, anti-slip grooves are defined on the surfaces of the anti-slip sleeves, the anti-slip grooves are smoothly connected to a function area on a housing of a video game controller, and widths of the anti-slip grooves are gradually narrowed around the holding portions from an inner side of the video game controller.

Optionally, three limiting grooves are defined on the upper body or the lower body, three limiting protrusions matched with the three limiting grooves are disposed on the inner wall of each of the anti-slip sleeves.

Optionally, the three limiting grooves are defined along a length direction of the holding portions, and depths of the three limiting grooves gradually become shallow along the length direction of the holding portions.

Beneficial effects of the housing assembly for video game controller are as follows.

Since the anti-slip sleeves are detachably connected to the holding portions of the body, the anti-slip sleeves may be replaced with a softer material according to needs of the users, and anti-slip treatment is carried out on the anti-slip sleeves, which not only prevents the video game controller from slipping off from the hands of the user, but also improves the comfortable sensation of the users

DETAILED DESCRIPTION

Figure 1:
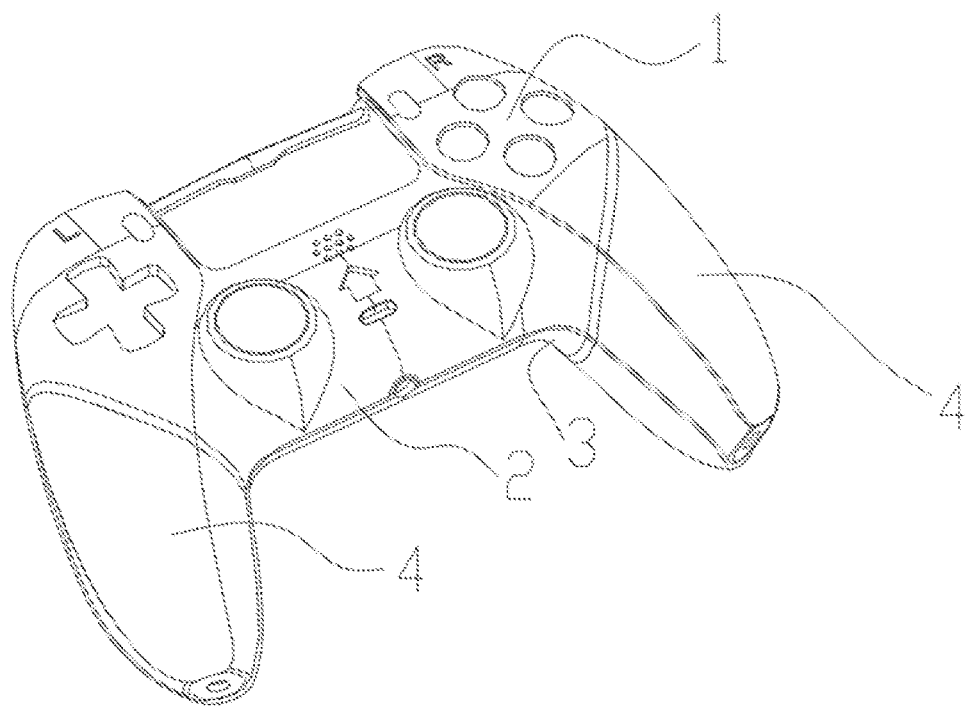
FIG. 1 is a structural schematic diagram of a housing assembly for video game controller according to one embodiment of the present disclosure.
Figure 2:
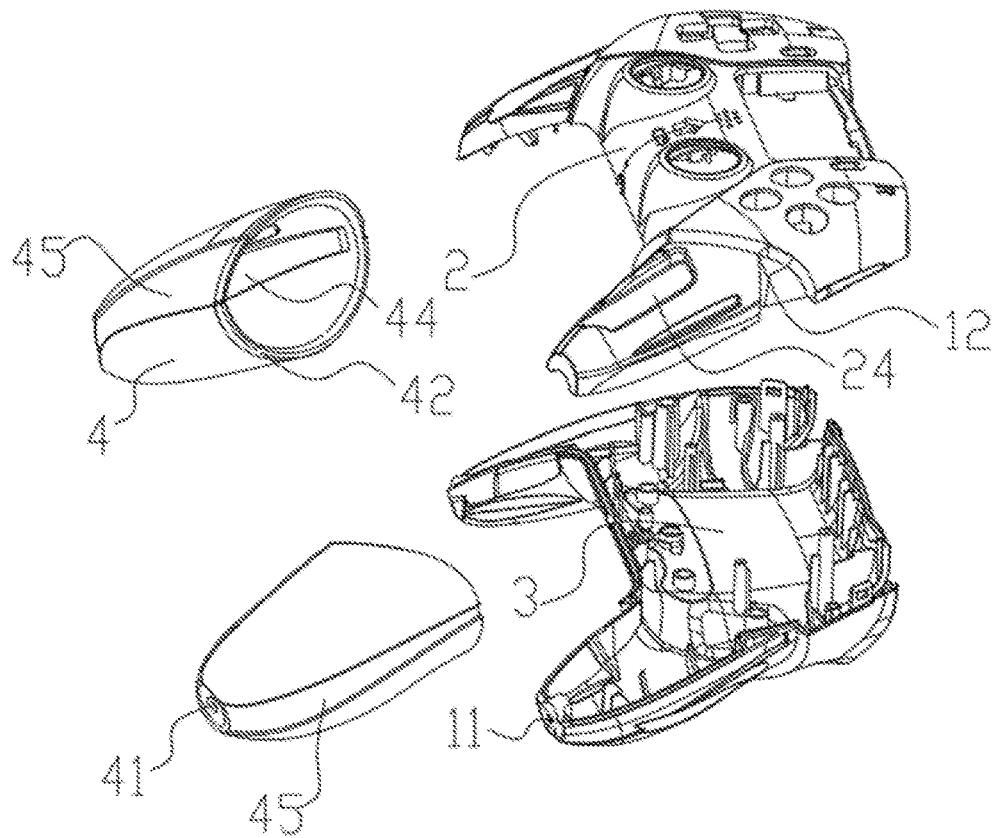
FIG. 2 is an exploded schematic diagram of the housing assembly for video game controller according to one embodiment of the present disclosure.

The present disclosure is further described and illustrated below with reference to specific embodiments and accompanying drawings:

As shown in FIGS. 1-2, technical solutions provided by a housing assembly for video game controller of the present disclosure are as follows.

The housing assembly for video game controller includes a body 1. The body 1 includes an upper body 2, a lower body 3, and two holding portions. The lower body 3 is assembled with the upper body 2, and anti-slip sleeves 4 are sleeved on the holding portions. The anti-slip sleeves 4 are detachably connected to the holding portions, and the anti-slip sleeves 4 are smoothly connected to the body 1.

The anti-slip sleeves 4 are detachably connected to the holding portions of the body 1. The anti-slip sleeves 4 are made of a softer and less slippery material according to needs of users, which prevents a video game controller from slipping off from hands of the user and improves comfortable sensation of users.

In the embodiment, a first fixing hole 41 is defined on a bottom end of one of the anti-slip sleeves 4, a second fixing hole 11 is defined on a bottom end of another one of the holding portions of the body 1, and the first fixing hole 41 is aligned with the second fixing hole 11. Each of the anti-slip sleeves 4 is fixed on the body 1 through screws through the first fixing hole 41 and the second fixing hole 11.

An annular inward convex step 42 is disposed on an open end of each of the anti-slip sleeves 4. The annular inward convex step 42 is matched and fixed with a groove 12 at a respective position of each of the holding portions of the body 1 to prevent the open end of each of the anti-slip sleeves 4 from deviating from the body 1.

At least one limiting groove 24 is defined on the upper body 2 or the lower body 3, a limiting protrusion 44 is respectively defined on an inner wall of each of the anti-slip sleeves 4, and the least one limiting groove 24 is matched with the limiting protrusion 44.

The anti-slip sleeves 4 are anti-slip silica gel sleeves or anti-slip plastic sleeves. Convex patterns are defined on surfaces of the anti-slip silica gel sleeves or the anti-slip plastic sleeves. Bumps may also be selected to define on the surfaces of the anti-slip silica gel sleeves or the anti-slip plastic sleeves. The convex patterns or bumps increase a friction force, so that the video game controller is not easy to slip off.

Anti-slip grooves 45 are defined on the surfaces of the anti-slip sleeves 4, the anti-slip grooves 45 are smoothly connected to a function area on a housing of a video game controller, and widths of the anti-slip grooves 45 are gradually narrowed around the holding portions from an inner side of the video game controller, which is beneficial to smoothly sleeve the anti-slip sleeves 4 on the holding portions of the body 1.

Three limiting grooves 24 are defined on the upper body 2 or the lower body 3, three limiting protrusions 44 matched with the three limiting grooves are disposed on the inner wall of each of the anti-slip sleeves, and the three limiting protrusions 44 are uniformly distributed on the inner wall of each of the anti-slip sleeves 4.

The three limiting grooves 24 are defined along a length direction of the holding portions, and depths of the three limiting grooves 24 gradually become shallow along the length direction of the holding portions.

Based on above, the anti-slip sleeves 4 are detachably disposed on the holding portions of the body 1, which achieves an anti-slip effect and improves the comfortable sensation of the users through replacing a material of the anti-slip sleeves 4.

Finally, it should be noted that the above embodiments are only configured to illustrate the technical solutions of the present disclosure, and are not intended to limit a protection scope of the present disclosure. Although the present disclosure has been described in details with reference to the preferred embodiments, it should be understood by those of ordinary skill in art that modifications or equivalent substitutions are made to the technical solutions of the present disclosure without departing from a spirit and the scope of the technical solutions of the present disclosure.

What is claimed is:

1. A housing assembly for a video game controller, comprising:
a body;
wherein the body comprises an upper body, a lower body, and two holding portions; the lower body is assembled with the upper body, and anti-slip sleeves are sleeved on the holding portions; the anti-slip sleeves are detachably connected to the holding portions, and the anti-slip sleeves are smoothly connected to the body to define a flush surface;
wherein an annular inward convex step is disposed on an open end of each of the anti-slip sleeves; a groove matched with the annular inward convex step is defined in each of the holding portions, and wherein the inward convex step is disposed in the respective groove;
wherein the anti-slip sleeves are formed through co-molding wherein an inner layer of each of the anti-slip sleeves is made of a relatively hard plastic, and an outer layer of each of the anti-slip sleeves is make of a relatively soft plastic.

2. The housing assembly according to claim 1, wherein a fixing hole is defined on a bottom end of each of the anti-slip sleeves, and each of the anti-slip sleeves is screwed to the body through the fixing hole.

3. The housing assembly according to claim 1, wherein at least one limiting groove is defined on the upper body or the lower body, a limiting protrusion matched with the at least one limiting groove is disposed on an inner wall of each of the anti-slip sleeves, and the limiting protrusion is disposed in the at least one limiting groove.

4. The housing assembly according to claim 1, wherein the anti-slip sleeves are anti-slip silica gel sleeves or anti-slip plastic sleeves, and convex patterns or bumps are defined on surfaces of the anti-slip sleeves.

5. The housing assembly according to claim 1, wherein anti-slip grooves are defined on surfaces of the anti-slip sleeves, the anti-slip grooves are flushly connected to a function area on a housing of a video game controller, and widths of the anti-slip grooves are progressively narrowed around the holding portions from an inner side of the video game controller.

6. The housing assembly according to claim 3, wherein three limiting grooves are defined in the upper body or the lower body, three limiting protrusions matched with the three limiting grooves are disposed on the inner wall of each of the anti-slip sleeves.

7. The housing assembly according to claim 6, wherein the three limiting grooves are defined along a length direction of the holding portions, and a depth of each of the three limiting grooves progressively becomes shallow along the length direction of the respective holding portion.

\* \* \* \* \*